J. HANSON.
FITTING FOR HIGH PRESSURE FLUID SYSTEMS.
APPLICATION FILED MAY 18, 1920.

1,403,773. Patented Jan. 17, 1922.

Inventor-
James Hanson,
By- A. Singer Atty

UNITED STATES PATENT OFFICE.

JAMES HANSON, OF STAFFORD, ENGLAND.

FITTING FOR HIGH-PRESSURE FLUID SYSTEMS.

1,403,773.    Specification of Letters Patent.    Patented Jan. 17, 1922.

Application filed May 18, 1920. Serial No. 382,344.

*To all whom it may concern:*

Be it known that I, JAMES HANSON, subject of the King of Great Britain, and a resident of Stafford, in the county of Stafford, England, have invented certain new and useful Improvements in and Connected with Fittings for High-Pressure Fluid Systems, (for which I have filed an application in England, February 5, 1919,) of which the following is a specification.

This invention relates to fittings for high pressure fluid systems, and has reference to that type of conical fitting wherein the angles of the cones of the male and female members differ.

Hitherto in such cases the included angle of the male, member has been smaller than that of the female member and the essential feature of the present invention consists in forming the junction between the two co-operating members with cone bearing engaging surfaces so constructed that the included angle of the conical portion of the internal or male member is greater than the included angle of the conical portion of the external or female member.

Figure 1:
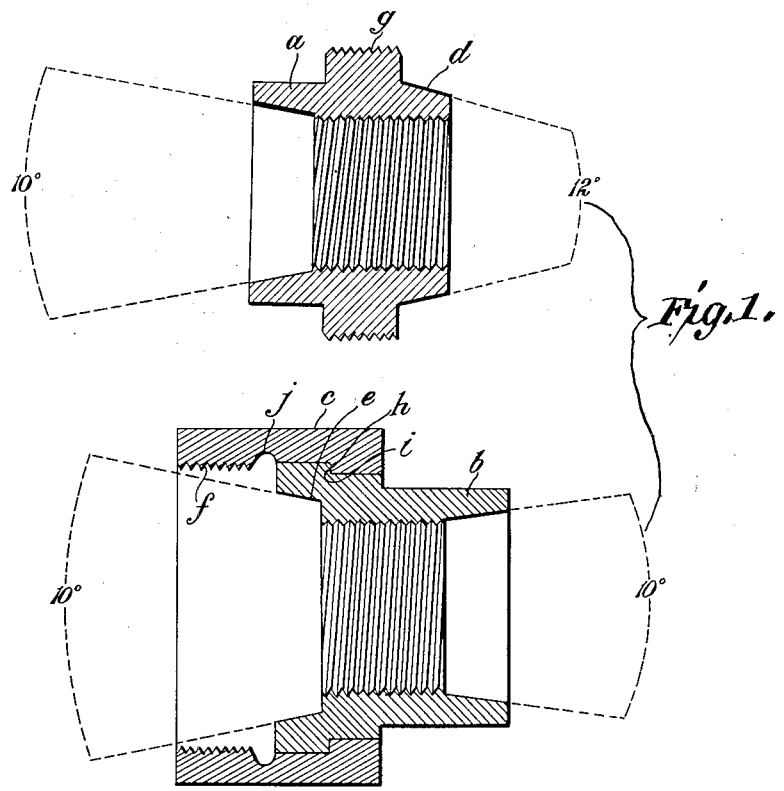
Figure 2:
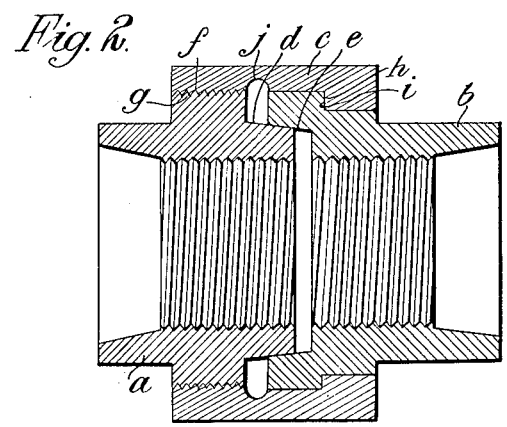

An application of the invention is illustrated in the accompanying drawings, in which Figure 1 is a sectional view of the two main portions of the fittings shown separated, while Figure 2 is a sectional view showing the two parts connected together.

In these drawings *a* is the male member provided with an external conical surface *d* adapted to be brought into fluid-tight engagement with the internal conical surface *e* provided in the female member *b*, suitable means such as the nut *c* being used for this purpose. This nut *c* is provided with an internal screw thread *f* adapted to engage a corresponding screw thread formed at *g* on a collar portion formed on the member *a*. The nut *c* is constructed with an internal shoulder portion *h* adapted to engage a corresponding collar portion *i* formed on the member *b*. The angle of the conical portion *d* of the member *a* is, in this example, made 12° (twelve degrees), while the angle of the corresponding portion *e* of the member *b* is made 10° (ten degrees). The nut *c* is grooved at *j*, that is at the inner end of the thread *f* in order to prevent the jamming of the thread *g* of the member *a* when the members are brought into engaging contact by the rotation of the nut *c*.

It will be readily understood that by the above construction wherein the angles of the conical co-acting surfaces are made slightly different in such fittings, a greater pressure can be obtained between the fluid-tight engaging surfaces than heretofore, thereby providing a more efficient fitting for high pressure fluid system. Also by the above construction considerable wear between the joints, due to coupling and uncoupling, can occur without affecting the fluid-tightness of the joint when made.

The invention is applicable to various kinds of such fittings having conical fluid-tight engaging surfaces, and provided with any suitable disconnectible means for drawing them together, such fittings may take the form of plugs, nipples, T and cross pieces, unions and elbows.

What I claim and desire to secure by Letters Patent is:—

1. A high pressure pipe fitting consisting of an inner member constituting a socket at one end and a spigot at the other, said socket being a conical recess whose included angle is less than the included angle of the spigot designed to fit into it and the spigot member being a truncated cone whose included angle is slightly greater than the included angle of the socket it is designed to fit, a screw threaded flange substantially centrally of said inner member designed to receive a shouldered union nut constituting an outer member, a second inner member having conical sockets at each of its ends the angles of which are slightly less than the angles of conical spigots designed to engage them, a shoulder on the outer periphery of said second inner member designed to engage the shoulder of the shouldered nut whereby when said shouldered nut is screwed onto the screw threaded flange of the first inner member the two inner members are driven together in leak-tight engagement, substantially as specified.

2. A high pressure pipe fitting consisting of an inner member constituting a socket at one end and a spigot at the other, said socket being a conical recess whose included angle is less than the included angle of the spigot designed to fit into it and the spigot member being a truncated cone whose included angle is slightly greater than the included angle of the socket it is designed to fit, a screw threaded flange substantially centrally of said inner member designed to receive a shouldered union nut constituting an outer member, a second inner member having conical sockets at each of its ends the angles of which are slightly less than the angles of conical spigots designed to engage them, a shoulder on the outer periphery of said second inner member designed to engage the shoulder of the shouldered nut whereby when said shouldered nut is screwed onto the screw threaded flange of the first inner member the two inner members are driven together in leak-tight engagement, and an internal screw thread within said inner member wherein screw threaded spigot pipe ends can be engaged in the sockets at each end of the fitting, substantially as specified.

In testimony whereof, I affix my signature.

JAMES HANSON.